(12) United States Patent
Tirronen et al.

(10) Patent No.: US 11,452,139 B2
(45) Date of Patent: *Sep. 20, 2022

(54) RANDOM ACCESS PROCEDURE FOR LATENCY REDUCTION

(71) Applicant: TELEFONAKTIEBOLAGET LM ERICSSON (PUBL), Stockholm (SE)

(72) Inventors: Tuomas Tirronen, Helsinki (FI); Osman Nuri Can Yilmaz, Espoo (FI); Helka-Liina Määttanen, Helsinki (FI); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,873

(22) Filed: Dec. 16, 2019

(65) Prior Publication Data

US 2020/0120718 A1    Apr. 16, 2020

Related U.S. Application Data

(63) Continuation of application No. 16/221,958, filed on Dec. 17, 2018, now Pat. No. 10,542,567, which is a
(Continued)

(51) Int. Cl.
*H04W 74/08* (2009.01)
*H04W 74/00* (2009.01)
(Continued)

(52) U.S. Cl.
CPC ..... *H04W 74/0833* (2013.01); *H04W 72/042* (2013.01); *H04W 72/14* (2013.01); *H04W 74/006* (2013.01); *H04W 72/0406* (2013.01)

(58) Field of Classification Search
CPC .......... H04W 74/0833; H04W 72/042; H04W 72/14; H04W 74/006; H04W 72/0406
(Continued)

(56) References Cited

U.S. PATENT DOCUMENTS

| 2012/0099543 A1 | 4/2012 | Yang |
| 2013/0064165 A1* | 3/2013 | Chen ................. H04W 56/0045 370/312 |

(Continued)

FOREIGN PATENT DOCUMENTS

| CN | 103391581 A | 11/2013 |
| CN | 104519591 A | 4/2015 |

(Continued)

OTHER PUBLICATIONS

3GPP TS 36.321, "Medium Access Control (MAC) protocol specification (Release 12)," V12.5.0, Mar. 2015.
(Continued)

*Primary Examiner* — Obaidul Huq

(57) ABSTRACT

Certain embodiments disclose a method in a wireless device. The wireless device receives a location of a time and/or frequency resource of a first Physical Random Access Channel (PRACH) from a network node. The wireless device receives a location of a time and/or frequency resource of a second PRACH. Furthermore, the wireless device transmits a first random access attempt via the first PRACH and transmits a second random access attempt via the second PRACH. The first PRACH and the second PRACH each have an associated preamble, and wherein the second PRACH preamble has a different length than the first PRACH preamble.

28 Claims, 16 Drawing Sheets

Related U.S. Application Data continuation of application No. 15/760,950, filed as application No. PCT/IB2016/055280 on Sep. 2, 2016, now Pat. No. 10,721,773.

(60) Provisional application No. 62/220,314, filed on Sep. 18, 2015.

(51) Int. Cl.
*H04W 72/04* (2009.01)
*H04W 72/14* (2009.01)

(58) Field of Classification Search
USPC .................................. 370/310, 328, 329
See application file for complete search history.

(56) References Cited

U.S. PATENT DOCUMENTS

| | | |
|---|---|---|
| 2013/0024273 A1 | 9/2013 | Pelletier |
| 2013/0242730 A1 | 9/2013 | Pelletier et al. |
| 2015/0078264 A1 | 3/2015 | Han et al. |
| 2015/0215911 A1 | 7/2015 | Dimou et al. |
| 2015/0305014 A1 | 10/2015 | Li et al. |
| 2016/0309518 A1 | 10/2016 | Patel et al. |
| 2018/0176000 A1 | 6/2018 | Lee et al. |
| 2019/0029050 A1 | 1/2019 | Li et al. |

FOREIGN PATENT DOCUMENTS

| | | |
|---|---|---|
| EP | 2673997 A1 | 11/2020 |
| KR | 20120041932 A | 5/2012 |
| WO | 2012106798 A1 | 8/2012 |

OTHER PUBLICATIONS

3GPP TS 36.331, "Radio Resource Control (RRC); Protocol Specification (Release 12)," V12.5.0, Mar. 2015.
3GPP TS 36.213, "Physical layer procedures (Release 12)," V12.0.0, Dec. 2013.
3GPP TS 26.211, "Physical channels and modulation (Release 12)," V12.0.0, Dec. 2013.
RP-150465, "SI: Study on Latency reduction techniques for LTE," 3GPP TSG RAN Meeting #67, Mar. 9-12, Shanghai, China, 2015.
Catt, System Analysis of UL TTI Shortening, 3GPP TSG RAN WG1 #84, R1-160739, Malta Feb. 15-19, 2019.

* cited by examiner

| PRB 20 | PRB 19 | PRB 18 | PRB 17 | PRB 16 | PRB 15 | PRB 14 | PRB 13 | PRB 12 | PRB 11 | PRB 10 | PRB 9 | PRB 8 | PRB 7 | PRB 6 | PRB 5 | PRB 4 | PRB 3 | PRB 2 | PRB 1 | OFDM Sym |
|---|---|---|---|---|---|---|---|---|---|---|---|---|---|---|---|---|---|---|---|---|
| PU | PU |  |  |  |  |  |  |  |  |  | i | i | i | i | i | i |  | PU | PU | 4 |
| PU | PU |  |  |  |  |  |  |  |  |  | i | i | i | i | i | i |  | PU | PU | 3 |
| PU | PU |  |  |  |  |  |  |  |  |  | i | i | i | i | i | i |  | PU | PU | 2 |
| PU | PU |  |  |  |  |  |  |  |  |  | i | i | i | i | i | i |  | PU | PU | 1 |
| PU | PU |  |  |  |  |  |  |  |  |  | i | i | i | i | i | i |  | PU | PU | 4 |
| PU | PU |  |  |  |  |  |  |  |  |  | i | i | i | i | i | i |  | PU | PU | 3 |
| PU | PU |  |  |  |  |  |  |  |  |  | i | i | i | i | i | i |  | PU | PU | 2 |
| PU | PU |  |  |  |  |  |  |  |  |  | i | i | i | i | i | i |  | PU | PU | 1 |
| PU | PU |  |  |  |  |  |  |  |  |  | S | S | S | S | S | S |  | PU | PU | 4 |
| PU | PU |  |  |  |  |  |  |  |  |  | S | S | S | S | S | S |  | PU | PU | 3 |
| PU | PU |  |  |  |  |  |  |  |  |  | S | S | S | S | S | S |  | PU | PU | 2 |
| PU | PU |  |  |  |  |  |  |  |  |  | X | X | X | X | X | X |  | PU | PU | 1 |
| PU | PU |  |  |  |  |  |  |  |  |  |  |  |  |  |  |  |  | PU | PU | 4 |
| PU | PU |  |  |  |  |  |  |  |  |  |  |  |  |  |  |  |  | PU | PU | 3 |
| PU | PU |  |  |  |  |  |  | L | L | L | L | L | L |  |  |  |  | PU | PU | 2 |
| PU | PU |  |  |  |  |  |  | L | L | L | L | L | L |  |  |  |  | PU | PU | 1 |
| PU | PU |  |  |  |  |  |  | L | L | L | L | L | L |  |  |  |  | PU | PU | 4 |
| PU | PU |  |  |  |  |  |  | L | L | L | L | L | L |  |  |  |  | PU | PU | 3 |
| PU | PU |  |  |  |  |  |  | L | L | L | L | L | L |  |  |  |  | PU | PU | 2 |
| PU | PU |  |  |  |  |  |  | L | L | L | L | L | L |  |  |  |  | PU | PU | 1 |
| PU | PU |  |  |  |  |  |  | L | L | L | L | L | L |  |  |  |  | PU | PU | 4 |
| PU | PU |  |  |  |  |  |  | L | L | L | L | L | L |  |  |  |  | PU | PU | 3 |
| PU | PU |  |  |  |  |  |  | L | L | L | L | L | L |  |  |  |  | PU | PU | 2 |
| PU | PU |  |  |  |  |  |  | L | L | L | L | L | L |  |  |  |  | PU | PU | 1 |
| PU | PU |  |  |  |  |  |  | L | L | L | L | L | L |  |  |  |  | PU | PU | 4 |
| PU | PU |  |  |  |  |  |  | L | L | L | L | L | L |  |  |  |  | PU | PU | 3 |
| PU | PU |  |  |  |  |  |  | L | L | L | L | L | L |  |  |  |  | PU | PU | 2 |
| PU | PU |  |  |  |  |  |  | L | L | L | L | L | L |  |  |  |  | PU | PU | 1 |

FIG. 6

RANDOM ACCESS PROCEDURE FOR LATENCY REDUCTION

RELATED APPLICATIONS

This is a Continuation U.S. application Ser. No. 16/221,958, filed Dec. 17, 2018 which is a Continuation of U.S. application Ser. No. 15/760,950, filed Mar. 16, 2018, which was a 371 of International Patent Application PCT/IB2016/055280, filed Sep. 2, 2016, which claims the benefit of U.S. Provisional Application No. 62/220,314, filed Sep. 18, 2015 and entitled "Random Access Procedure for Latency Reduction," the disclosures of which are all hereby incorporated by reference.

TECHNICAL FIELD

Certain embodiments of the present disclosure relate, in general, to wireless communications and, more particularly, to random access procedures for latency reduction.

BACKGROUND

Packet data latency is a key performance metric in today's communication systems. Patent data latency is regularly measured by vendors, operators, and end-users (e.g., via speed test applications). Latency is measured throughout the lifetime of a radio access network system. For example, latency is measured when verifying a new software release or system component, when deploying a system, and after the system is put in commercial operation.

From the beginning, the long term evolution (LTE) radio access technology was designed with low latency in mind. As a result, today LTE has better packet data latency than previous generations of 3rd Generation Partnership Project (3GPP) radio access technologies. A wide range of end-users recognize LTE as a system that provides faster access to internet and lower data latencies than previous generations of mobile radio technologies.

Since the introduction of LTE in 2009, several improvements have been developed, such as Carrier Aggregation (CA), 8×8 multiple-input multiple-output (MIMO) operation, and so on. The main target of the improvements has been increasing the maximum data rates of the system. To get the full benefit of these data rate enhancements, enhancements to reduce latency should be an important part of the future evolution track of LTE. An ongoing 3GPP study item aims to shorten the packet data latency over the LTE air interface. One of the discussed options is to shorten the transmission time interval (TTI) length, which is currently 14 Orthogonal Frequency Division Multiplexing (OFDM) symbols.

Certain embodiments of the present disclosure relate to random access procedures for latency reduction. As background, FIGS. 1-2 illustrate prior random access procedures in LTE. During initial access, a user equipment (UE) seeks access to the network in order to register and commence services. The random access procedure serves as an uplink control procedure to enable the UE to access the network and acquire proper uplink timing (synchronize uplink). Since the initial access attempt cannot be scheduled by the network, the initial random access procedure is by definition contention based. Collisions may occur and an appropriate contention-resolution scheme should be implemented. Including user data on the contention-based uplink is not spectrally efficient due to the need for guard periods and retransmissions. Therefore, the LTE specification separates the transmission of the random access burst (preamble), whose purpose is to obtain uplink synchronization, from the transmission of user data.

Other reasons for initiating the random access procedure, beyond initial network access or establishing a radio link (i.e., moving radio resource control (RRC) state from RRC_IDLE to RRC_CONNECTED) include performing handover to establish uplink synchronization to a new cell, establishing uplink synchronization when the UE needs to transmit in the uplink (e.g., data or hybrid automatic repeat request (HARQ) feedback) when it has lost uplink synchronization while in RRC_CONNECTED, and when no scheduling request resources have been configured on the Physical Uplink Control Channel (PUCCH) and the UE wants to transmit data in the uplink.

When uplink data arrives and the UE wants to transmit, it needs to be in RRC_CONNECTED mode, have its uplink synchronized (assigned MAC time alignment timer has not expired), and have scheduling request resources configured. If any of these requirements is not met, the UE initiates the random access procedure. The goal of the procedure is to acquire proper uplink timing in order for the UE to be able to send uplink data.

FIGS. 1-2 outline basic random access procedures. The figures illustrate messages communicated between a UE and a network node, such as an enhanced Node B or "eNB." FIG. 1 illustrates a contention based random access procedure in the case of initial access. At step 10, the UE sends a random access preamble to the network node. In LTE, the random access preambles are transmitted over the Physical Random Access Channel (PRACH). The transmission of preambles is limited to certain time and frequency resources. The time and frequency resources are configured by upper layers (in system information). For Frequency Division Duplex (FDD—frame structure format 1), the PRACH frequency can currently vary from every subframe to once in every other radio frame (i.e., once in every 20 ms).

The PRACH resource has bandwidth corresponding to 6 physical resource blocks. The length of the PRACH preamble in time depends on the preamble format being used. For example, the basic format 0 fits into one subframe (1 ms) and can be used in cell sizes up to 15 km. For FDD, only one random access region per subframe can be configured. There are 64 different preamble sequences available in each cell. The preambles can be divided into (two) subsets, and the UE selects one sequence from one subset uniformly at random before performing the preamble transmission. The configuration of the PRACH resources in a cell is done by RRC protocol, and the configuration is the same for all UEs in a cell.

At step 12, the network node sends the UE a random access response. In LTE, the random access response can be sent using the Physical Downlink Shared Channel (PDSCH). The random access response includes an initial assignment of uplink resources. At step 14, the UE sends the network node an RRC Connection Request. The message is sent using the uplink resources assigned by the network node in step 12. The message requests to establish a connection at the radio resource control (RRC) layer. In LTE, the RRC Connection Request can be sent on the Physical Uplink Shared Channel (PUSCH). At step 16, the network node sends the UE an RRC Connection Setup message in order to establish the RRC connection.

FIG. 2 illustrates an example of contention free random access in the case of initial access. At step 20, the network node sends a random access preamble assignment to the UE. Assignment of the random access preamble by the network node allows the network node to coordinate the allocation of random access preambles among a number of UEs so that the random access procedure can be contention-free. At step 22, the UE sends the network node the random access preamble that was assigned to the UE in step 20. For simplicity, FIG. 2 illustrates an example in which the UE sends the random access preamble to the same network node that assigned the random access preamble. However, it is possible for the UE to send the random access preamble to a different network node (i.e., a network node other than the one that assigned the preamble), for example, in the case of a handover. At step 24, the network node sends the random access response. As described with respect to FIG. 1, the UE and network node may establish an RRC Connection after the network node has sent the random access response.

Random access procedures can introduce latencies. For example, in the contention-based random access procedure described with respect to FIG. 1, the UE may have to wait for a PRACH opportunity before sending a preamble. The wait depends on the periodicity of the PRACH. As an example, the wait may be 0.5 TTI. Preamble transmission may require 1 TTI. The network node receives the preamble and processes the preamble. Processing may introduce a delay that depends on the implementation of the network node. The delay may be on the order of 3 TTI. The network node then sends the random access response to the UE via the PDSCH. The UE listens during the random access response window and receives the response after 1 TTI. The UE decodes the uplink grant and performs L1 encoding of uplink data. The UE processing delay may be on the order of 5 TTIs. The UE sends uplink data to the network node, which may require an additional 1 TTI. Thus, the total time for the random access procedure in the example is 11.5 TTIs.

SUMMARY

Embodiments of the present disclosure provide solutions to problems associated with existing random access procedures. One problem with existing random access procedures it that the preamble length does not allow a UE to maximize the benefits of shorter TTI transmissions when the UE is out-of-synch. Additionally, the UE may need to wait until the next PRACH opportunity before it can send the random access preamble. It is possible in current specifications to have PRACH every subframe, but in practice this is typically not used as it is very resource inefficient to have dedicated PRACH for every subframe.

The proposed solutions include defining and scheduling uplink resources for a new physical random access channel, referred to herein as a shortened-PRACH or sPRACH, and defining procedures for using the sPRACH. For example, the present disclosure includes procedures that wireless devices/UEs can use when transmitting random access preambles via the sPRACH and procedures that network nodes can use when receiving random access preambles via the sPRACH. In certain embodiments, dynamic scheduling initiated by the medium access control (MAC) layer may be used. Certain embodiments of the disclosure make use of the existing LTE resource grid so as not to affect legacy devices or devices not using latency improvements.

The present disclosure proposes both contention-free and contention-based procedures for random access targeted for low latency operation. In certain embodiments, the sPRACH is scheduled in downlink control information (DCI). In certain embodiments, the sPRACH is configured with a preamble sequence that is shorter than a legacy preamble sequence. As an example, the sPRACH preamble sequence is shorter than the 800 microseconds length PRACH preamble that, together with cyclic prefix and guard time, occupies 1 millisecond (i.e., 14 OFDM symbols) in legacy LTE specifications. The shorter preamble sequence may maximize the benefits of shorter TTI transmissions. The shorter preamble costs in terms of bandwidth or the number of accessible preamble sequences with respect to the legacy PRACH. Out-of-synch UEs could use the sPRACH to achieve shorter latency between when the UE receives data that is supposed to be sent to the network node via the uplink and when the UE is able to send the received data to the network node. Likewise, in the contention-based alternative, time spent for the whole random access procedure will be shorter. Scheduling of sPRACH differs from legacy (static) PRACH and can be controlled by the MAC layer, for example, by including the sPRACH scheduling within the DCI/semi-persistent scheduling (SPS) grant. The proposed solutions work both if the TTI length is reduced from current 14 OFDM symbols or if the legacy TTI length is kept within legacy subframes.

Certain embodiments disclose a method in a network node. The method broadcasts a location of a time and/or frequency resource of a first Physical Random Access Channel (PRACH). The first PRACH has a static location. The method determines a location of a time and/or frequency resource for a second PRACH. The location of the second PRACH is determined dynamically. The method communicates downlink control information to a wireless device. The downlink control information indicates the location of the second PRACH. The method receives a random access attempt from the wireless device. The random access attempt is received via the first PRACH or the second PRACH. The method communicates a random access response to the wireless device.

Certain embodiments disclose a network node comprising memory and one or more processors. The network node is operable to broadcast a location of a time and/or frequency resource of a first Physical Random Access Channel (PRACH). The first PRACH has a static location. The network node is operable to determine a location of a time and/or frequency resource for a second PRACH. The location of the second PRACH determined dynamically. The network node is operable to communicate downlink control information to a wireless device. The downlink control information indicates the location of the second PRACH. The network node is operable to receive a random access attempt from the wireless device. The random access attempt is received via the first PRACH or the second PRACH. The network node is operable to communicate a random access response to the wireless device.

In certain embodiments, the time and/or frequency resource of the first PRACH is defined according to a legacy 3GPP standard. In certain embodiments, the second PRACH is shorter than the first PRACH. In certain embodiments, the first PRACH uses at least a portion of a same subframe as the second PRACH and the first PRACH uses different subcarriers than the second PRACH. In certain embodiments, a single subframe comprises both (a) the downlink control information that indicates the location of the second PRACH, and (b) the second PRACH. In certain embodiments, the downlink control information implicitly or explicitly indicates a preamble sequence to be used by the wireless device when sending random access attempts via the second PRACH. In certain embodiments, the location of the second PRACH is determined dynamically based on granting a semi persistent uplink grant for the second PRACH resource to the wireless device. In certain embodiments, the method further comprises broadcasting a message indicating that the network node supports the second PRACH.

Certain embodiments disclose a method in a wireless device. The method receives a location of a time and/or frequency resource of a first Physical Random Access Channel (PRACH) from a network node. The first PRACH has a static location. The method receives downlink control information from the network node. The downlink control information indicates the location of a second PRACH. The second PRACH has a dynamic location. The method communicates a random access attempt via the second PRACH.

In certain embodiments, the method further comprises receiving a message indicating that the network node supports the second PRACH and, in response, monitoring the downlink control information to determine the location of the second PRACH.

In certain embodiments, the method further comprises communicating a random access attempt via the first PRACH in response to determining that the random access attempt via the second PRACH is unsuccessful.

In certain embodiments, the method further comprises communicating a random access attempt via the first PRACH in response to determining that there is no second PRACH.

Certain embodiments disclose a wireless device comprising a memory and one or more processors. The wireless device is operable to receive a location of a time and/or frequency resource of a first Physical Random Access Channel (PRACH) from a network node. The first PRACH has a static location. The wireless device is operable to receive downlink control information from the network node. The downlink control information indicates the location of a second PRACH. The second PRACH has a dynamic location. The wireless device is operable to communicate a random access attempt via the second PRACH.

In certain embodiments, the wireless device is further operable to receive a message indicating that the network node supports the second PRACH and, in response, monitor the downlink control information to determine the location of the second PRACH.

In certain embodiments, the wireless device is further operable to communicate a random access attempt via the first PRACH in response to determining that the random access attempt via the second PRACH is unsuccessful.

In certain embodiments, the wireless device is further operable to communicate a random access attempt via the first PRACH in response to determining that there is no second PRACH.

In certain embodiments, the time and/or frequency resource of the first PRACH is defined according to a legacy 3GPP standard. In certain embodiments, the second PRACH is shorter than the first PRACH. In certain embodiments, the first PRACH uses at least a portion of a same subframe as the second PRACH and the first PRACH uses different subcarriers than the second PRACH. In certain embodiments, a single subframe comprises both (a) the downlink control information that indicates the location of the second PRACH, and (b) the second PRACH. In certain embodiments, the downlink control information implicitly or explicitly indicates a preamble sequence to be used by the wireless device when sending random access attempts via the second PRACH. In certain embodiments, receiving the downlink control information indicating the location of the second PRACH implicitly or explicitly indicates that the wireless device is to override the first PRACH.

Certain embodiments of the present disclosure may provide one or more technical advantages. As an example, certain embodiments shorten the latency associated with legacy random access procedures. As another example, certain embodiments configure contention-free access for a larger number of UEs compared to legacy, e.g., due to a certain frequency allocation, such as center-6 physical resource blocks (PRBs). As another example, low-latency UEs (UEs using the sPRACH) do not increase the load of the legacy PRACH channel or processing of legacy RACH procedure. As another example, a dedicated random access region for the sPRACH avoids traffic mixing and avoids the need for a complete design change. As another example, certain embodiments allow for resource use flexibility and load balancing. Flexible scheduling can be controlled by the MAC layer. As another example, shorter preamble formats can be configured with reduced TTI lengths or with legacy TTI lengths. Certain embodiments may have all, some, or none of these advantages. Other advantages will be apparent to persons of ordinary skill in the art.

BRIEF DESCRIPTION OF THE DRAWINGS

FIG. 4A illustrates an example of a resource grid configured with a low-latency physical random access channel, in accordance with certain embodiments of the present disclosure.

FIG. 4B illustrates an example of a resource grid configured with a low-latency physical random access channel, in accordance with certain embodiments of the present disclosure.

FIG. 5 illustrates an example of a resource grid configured with a low-latency physical random access channel, in accordance with certain embodiments of the present disclosure.

FIG. 6 illustrates an example of a resource grid configured with a low-latency physical random access channel, in accordance with certain embodiments of the present disclosure.

DETAILED DESCRIPTION

Figure 1:
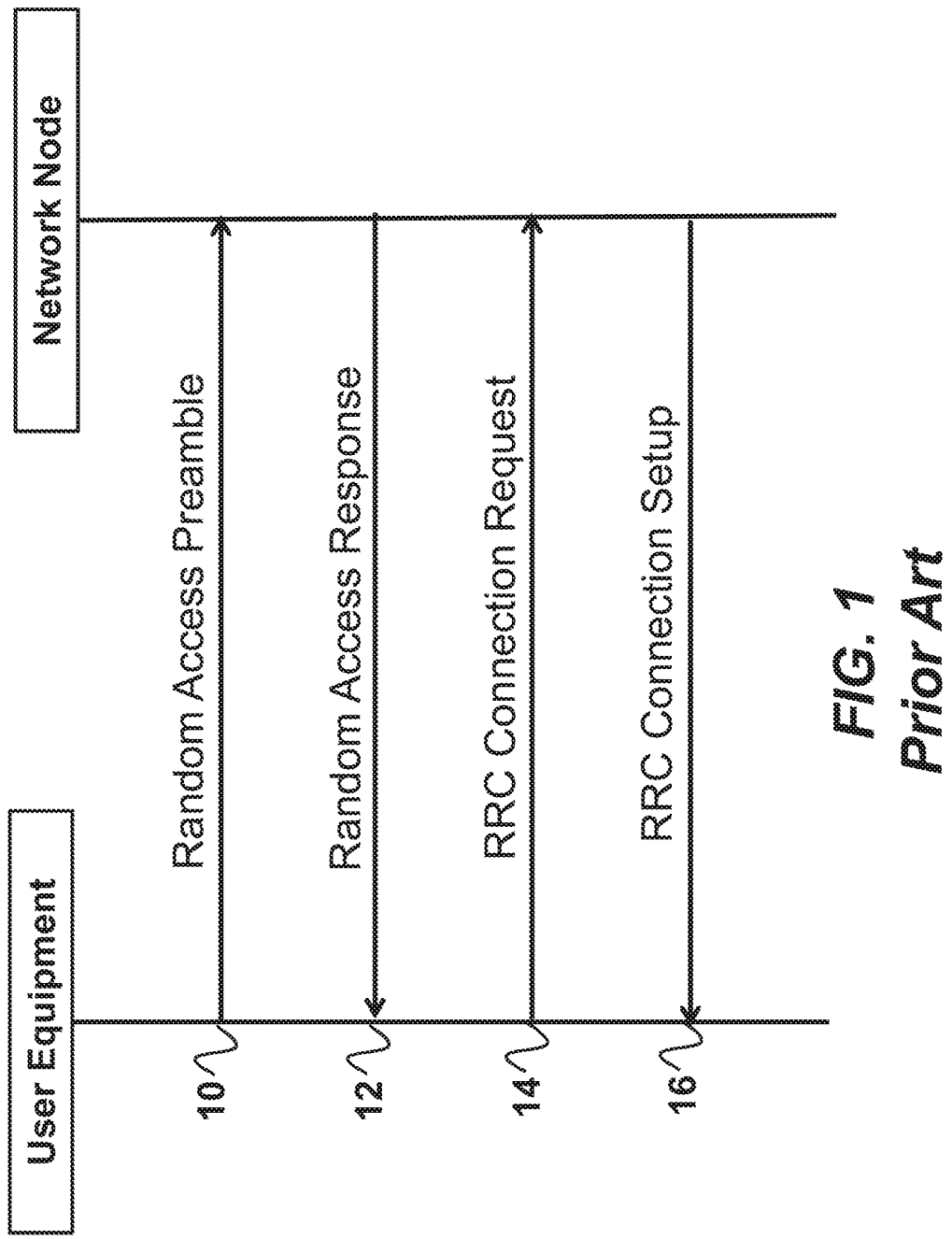
FIG. 1 illustrates an example message flow for a contention based random access procedure in the case of initial access, as known in the prior art.
Figure 2:
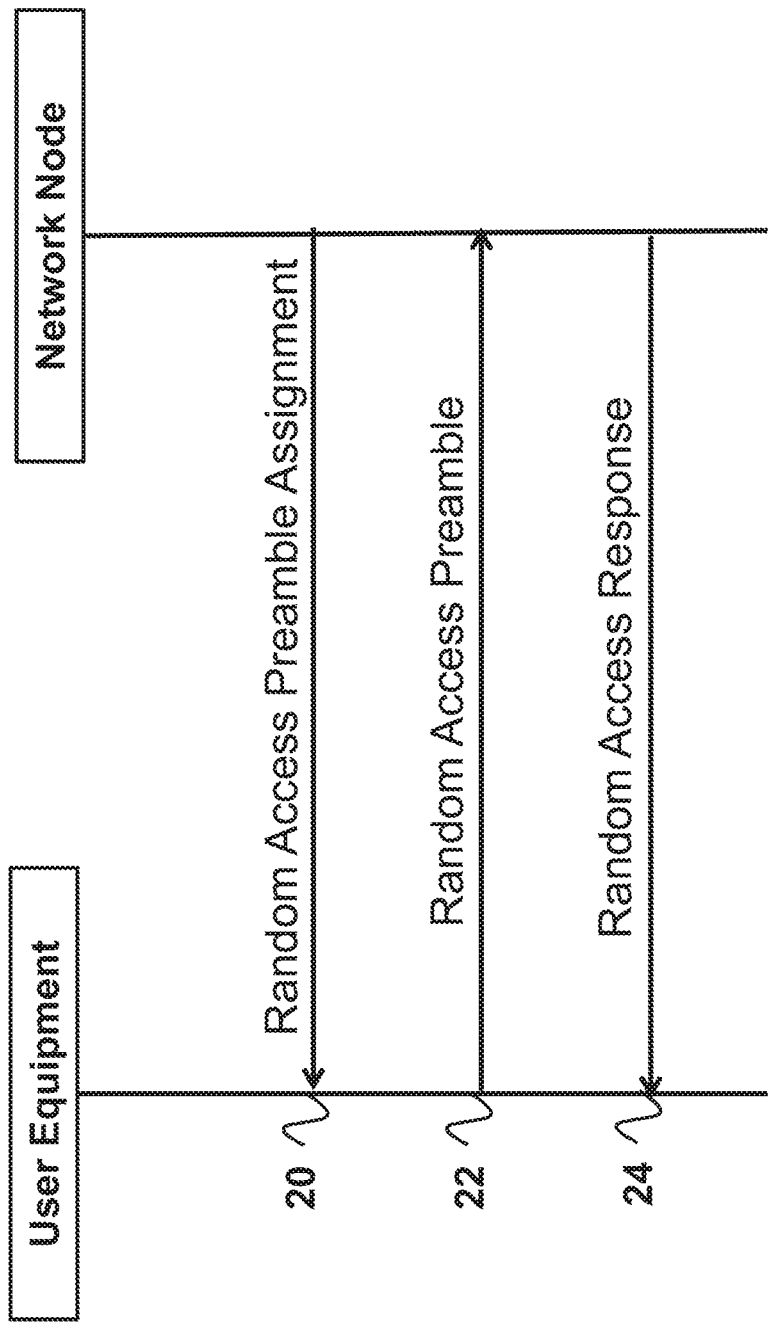
FIG. 2 illustrates an example message flow for a of contention free random access in the case of initial access, as known in the prior art.

Wireless networks use random access procedures to initiate connections between wireless devices 110 and network nodes 120. The random access procedures used in legacy wireless networks tend to introduce latencies. For example, latencies can be introduced when waiting for an opportunity to transmit random access related messages, when transmitting the random access related messages over the wireless interface, and/or when processing the random access related messages. The present disclosure proposes solutions that may reduce latencies associated with random access procedures. The proposed solutions include defining and scheduling uplink resources for a new physical random access channel, referred to herein as the sPRACH, and defining procedures for using the sPRACH. For example, the present disclosure includes procedures that wireless devices 110 (which are interchangeably referred to herein as UEs) can use when transmitting random access preambles via the sPRACH and procedures that network nodes 120 can use when receiving random access preambles via the sPRACH.

In an embodiment, the sPRACH resources are defined in the LTE resource grid in a way that legacy UEs are not affected. For example, legacy UEs are not scheduled on the resources reserved for the sPRACH. The sPRACH uses a shorter preamble sequence than the legacy preamble sequence. As examples, FIGS. 4-5 described below illustrate embodiments in which 4 OFDM symbols are reserved for the sPRACH (as compared to the 14 OFDM symbols reserved for the legacy preamble sequence), and FIG. 6 described below illustrates an embodiment in which 3 OFDM symbols are reserved for the sPRACH (as compared to the 14 OFDM symbols reserved the legacy preamble sequence). The shorter preamble sequences decrease latency. The sPRACH can be scheduled in various ways depending on factors such as whether the random access is contention-based or contention-free.

In one embodiment, shorter preamble sequences make it possible to multiplex a number of UEs in the same legacy TTI (1 ms) both in the time and code domains. Depending on the length of the preamble, it could also be possible to have the preamble sent within the same legacy TTI that is used to send and/or receive subsequent messages, such as the random access response message. As an example, assume a 200 µs preamble N×100 µs processing M×100 µs random access reception where (2+N+M)<=10. This would require defining sPUSCH and downlink resources in a compatible way (see e.g., FIG. 4A).

Certain embodiments are described using shortened TTI versions of the current LTE physical channels, e.g., shortened-Physical Downlink Control Channel (sPDCCH), shortened-Physical Downlink Shared Channel (sPDSCH), and shortened-Physical Uplink Shared Channel (sPUSCH). The exact name of these channels may be different, but the idea is that these channels are defined and used for shorter TTI than the current 14 OFDM symbols. The solutions would work if future 3GPP releases introduce shorter TTIs (see e.g., FIG. 6), and also if the legacy TTI structure is kept by defining the sPRACH inside existing TTIs in the LTE resource grid (see e.g., FIGS. 4-5).

Figure 3A:
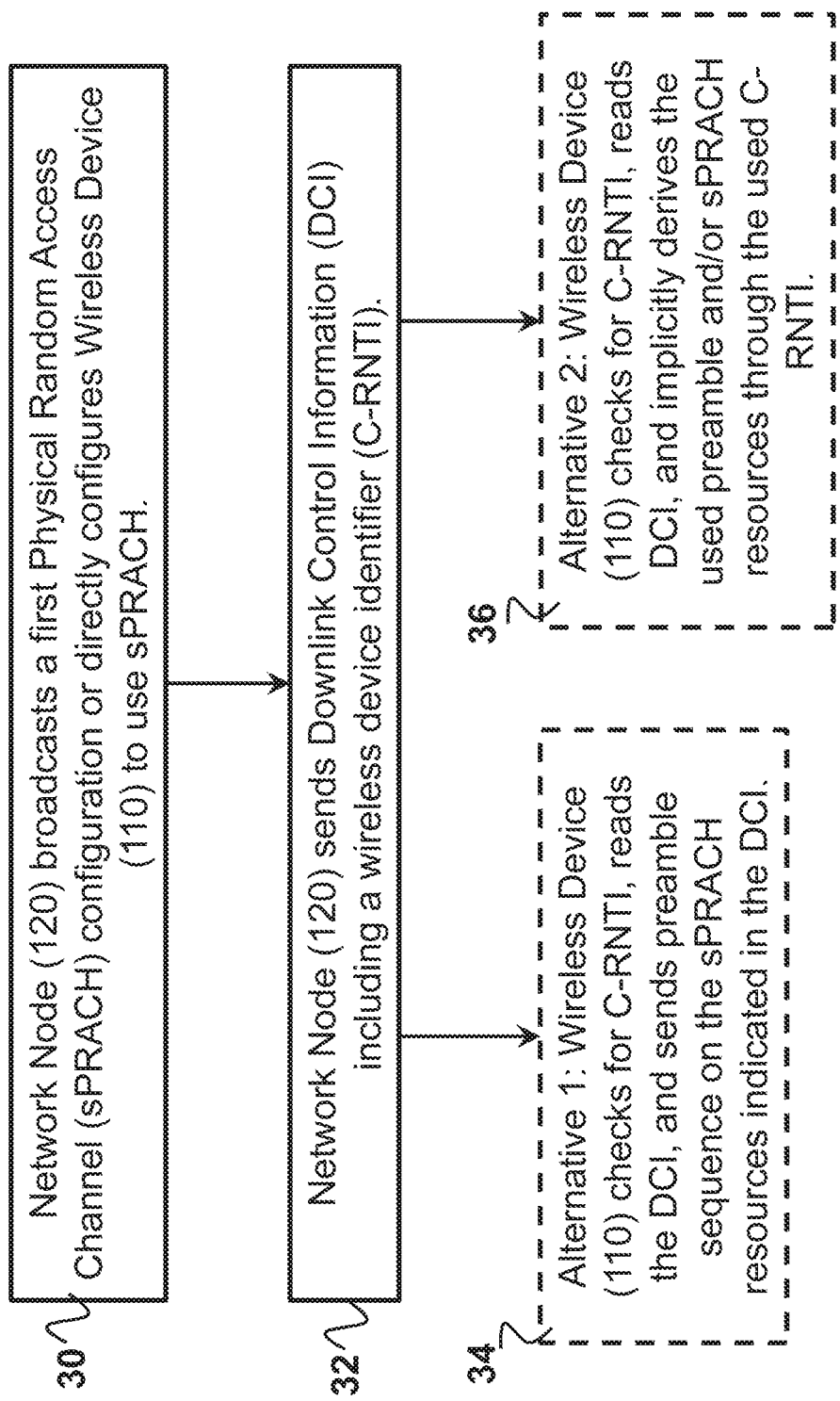
FIG. 3A illustrates an example of a flowchart for a contention-free random access procedure, in accordance with certain embodiments of the present disclosure.
Figure 3B:
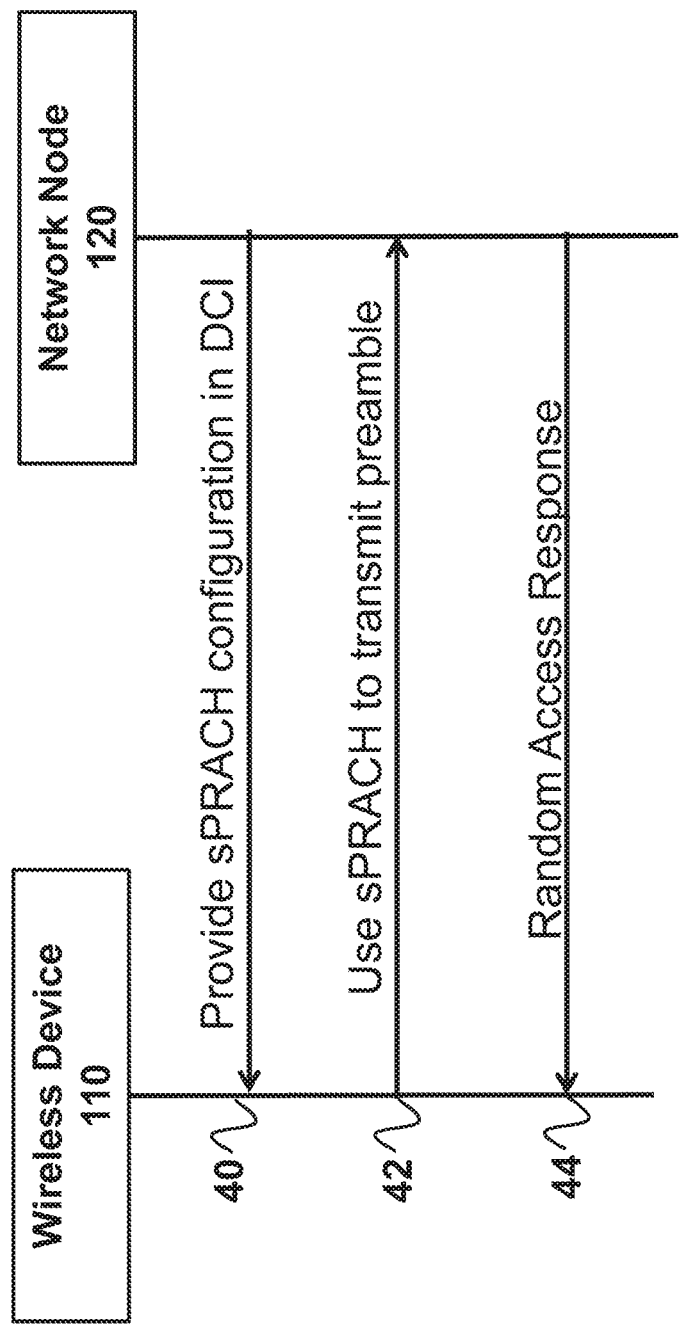
FIG. 3B illustrates an example of a message flow for a contention-free random access procedure, in accordance with certain embodiments of the present disclosure.

FIGS. 3A-3B illustrates examples of contention-free random access procedures, in accordance with certain embodiments of the present disclosure. In general, the contention-free random access alternative schedules the sPRACH in downlink control information (DCI) dynamically. This means wireless device 110 listens to the control channel (e.g., PDCCH/EPDCCH/sPDCCH) and decodes DCI, which further indicates available sPRACH resources. Network node 120 also instructs wireless device 110 to use a specific preamble so that a separate UE identity does not need to be sent during the random access procedure.

In one embodiment, the used sPRACH resources and/or preamble sequence are derived through the used Cell Radio Network Temporary Identifier (C-RNTI) or similar identifier used to address downlink control information to specific wireless devices 110. The derivation can be done by using a function that maps the used identifier (e.g., C-RNTI) to the preamble/sPRACH resources. That is, the used preamble/sPRACH resources=f(C-RNTI).

In the flow chart illustrated in FIG. 3A, at step 30, network node 120 broadcasts a first Physical Random Access Channel (sPRACH) configuration or directly configures wireless device 110 to use the sPRACH. At step 32, network node 120 sends downlink control information (DCI) including a wireless device identifier (e.g., C-RNTI). For example, the DCI may include a cyclic redundancy check (CRC) that has been scrambled with the C-RNTI. In one alternative, the procedure continues to step 34 (omitting step 36), and wireless device 110 checks for its C-RNTI, reads the DCI, and sends a preamble sequence on the sPRACH resources indicated in the DCI. In another alternative, the procedure continues from step 32 to step 36 (omitting step 34), and wireless device 110 checks for its C-RNTI, reads the DCI, and implicitly derives the used preamble and/or sPRACH resources through the used C-RNTI.

In one embodiment the sPRACH resources which are used are mapped to the same resources used for sPUSCH, when these sPUSCH resources are free (not scheduled).

FIG. 3B illustrates example steps for a contention-free procedure. The method begins with network node 120 (e.g., an eNB) detecting the arrival of downlink data for wireless device 110. At step 40, network node 120 instructs wireless device 110 to select a specific random access preamble and gives the sPRACH configuration to be used by the wireless device 110. The signaling is done via the MAC layer using DCI over PDCCH or EPDCCH or sPDCCH (or any similar downlink control channel defined for this purpose). In one embodiment, embodiment A, some of the legacy DCI formats are reused for this purpose, for example DCI format 1A. In another embodiment, embodiment B, a new DCI format is defined containing at least information on what preamble sequence to use. Additionally, the sPRACH resource to be used can be included. Additionally, a semi persistent grant might be given, which specifies the maximum duration of the grant.

A MAC entity of wireless device 110 receives the DCI over the PDCCH (or EPDCCH or sPDCCH), and at step 42 wireless device 110 transmits the signaled preamble using the sPRACH channel. The used preamble and/or sPRACH resource to be used can be signaled explicitly in DCI or derived implicitly, e.g., from the used C-RNTI.

At step 44, network node 120 answers by sending a Random Access Response (RAR) to the UE, containing at least timing alignment information. In certain embodiments, this RAR is carried by sPDSCH in order to reduce latency. (Optionally, the RAR can be carried by PDSCH).

In an example embodiment where the DCI is sent over PDCCH, the actual sPRACH channel is located in the same subframe with the corresponding PDCCH. This can be done when the preambles are short enough so they will fit in the same subframe. In this case the preamble sequence length would be 11 OFDM symbols at maximum, preferably less to account for distant-dependent time uncertainty. See FIG. 5 for an example of the resource grid for preamble length of 4 OFDM symbols.

Similarly, in alternative embodiments, if other types of control channels are used, the sPRACH resources could be located in the same subframe if the control channel is located earlier in time domain compared to sPRACH resources, so that the DCI can be decoded before UE starts sending the preamble sequence.

While the particular embodiments are described above in terms of particular methods, as indicated above, these methods may be performed by particular network nodes (e.g., eNB, UE, etc.). These nodes may comprise a processor and a memory containing computer-executable instructions. When these instructions are executed by the processor, the network node is thereby operative to perform the steps discussed above. These network nodes are discussed in more detail below with regard to FIGS. 8-12 below.

The preceding examples have been described in the context of contention-free random access. In addition, or in the alternative, certain embodiments may support contention-based random access. In the contention-based random access alternative, one or more wireless devices 110 receive a grant for using the sPRACH resources, and the wireless devices 110 transmit if they need. This can result in contention if several wireless devices 110 select the same preamble to be transmitted over the same resources at the same time. However, different sPRACH preambles from different users can be detected independently by the use of different root preamble sequences or by different cyclic shifts of the root preamble sequences.

In one embodiment, semi-persistent scheduling (SPS) or a similar scheme is used to schedule the used sPRACH resources, e.g., within the SPS grant. This scheduling is done by sending a persistent "grant" for wireless devices 110 supporting and using the sPRACH feature. The grant should include at least the location of the used resources (time and frequency) and the periodicity of the sPRACH if it is not scheduled continuously. When the sPRACH resources are not expected to be used anymore the grant can be released.

If contention is detected, it can be resolved using similar mechanism currently used during the random access procedure.

While the particular embodiments are described above in terms of particular methods, as indicated above, these methods may be performed by particular network nodes (e.g., eNB, UE, etc.). These nodes may comprise a processor and a memory containing computer-executable instructions. When these instructions are executed by the processor, the network node is thereby operative to perform the steps discussed above. These network nodes are discussed in more detail below with regard to FIGS. 8-12 below.

Figure 4A:
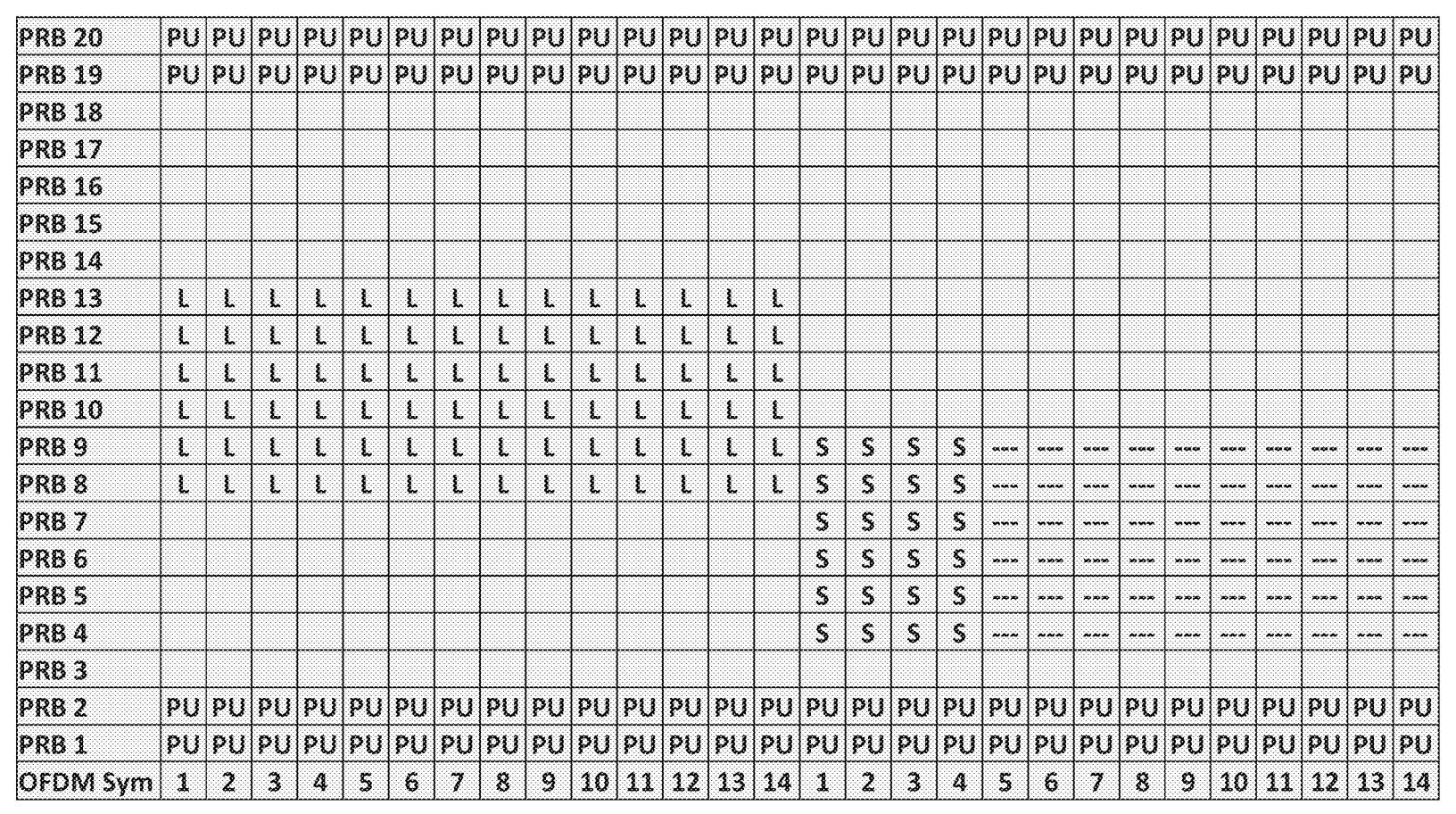
Figure 4B:
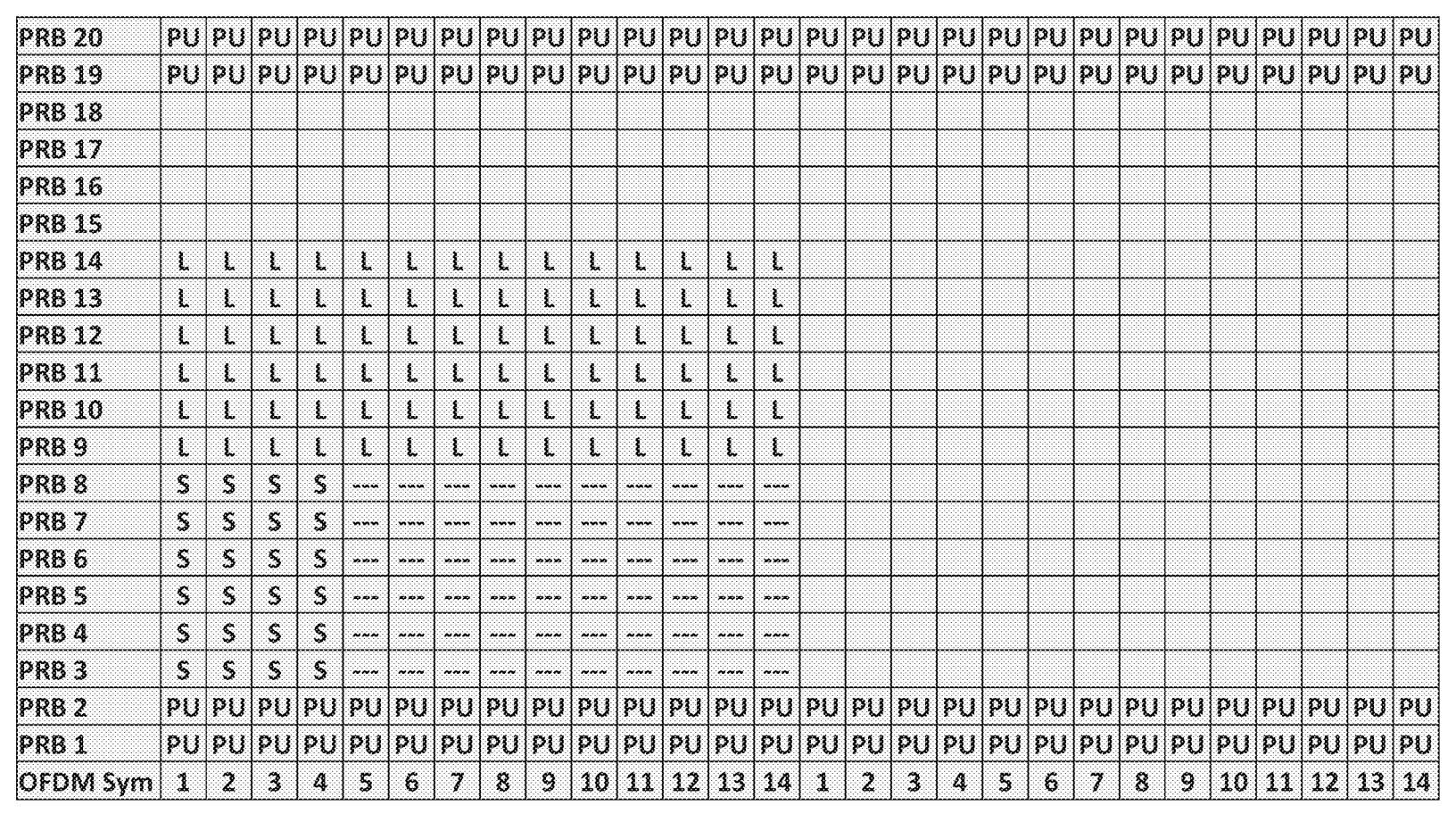
Figure 5:
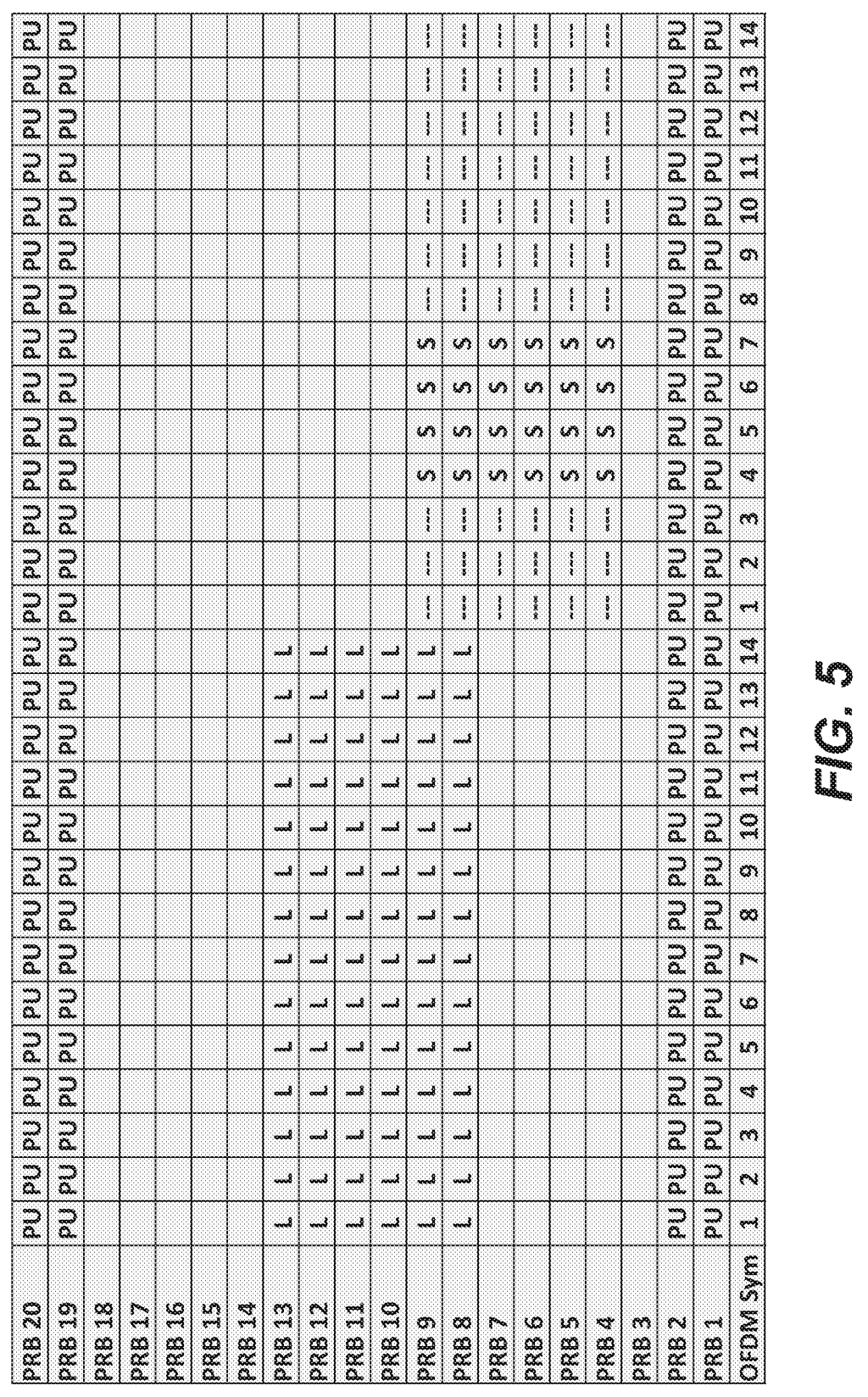

FIGS. 4-6 illustrate examples of resource grids that can be configured to include the sPRACH. In the contention-free case, the sPRACH is scheduled dynamically and thus there is no need for a static configuration (other than network node 120 knowing that wireless device 110 supports using sPRACH). In another alternative, the RRC protocol is used to configure a semi-static set of possible sPRACH resources, where the specific resources used are signaled to wireless device 110. The configuration can be broadcasted in system information or sent to wireless devices 110 using dedicated signaling, as in legacy operation. Similarly, the available set of preambles, if not fixed in the specification, can be signaled using dedicated RRC signaling or alternatively in broadcasted system information.

In the contention-free case, the sPRACH could be statically configured (as PRACH today). However, more dynamic scheduling may be preferable. SPS or a similar scheme could be used for more dynamic reservation and release of the sPRACH resources.

In one embodiment, the dynamic sPRACH configuration by a new DCI format depends on a semi persistent uplink grant. Here, the sPRACH is for example configured to use the same frequency allocation as in the SPS, but can be triggered to be transmitted at a specific time by a dynamic grant.

FIG. 4A illustrates an LTE uplink resource grid in which the horizontal dimension is labeled by OFDM symbols and the vertical dimension is labeled by physical resource blocks (PRBs). One full (legacy) PRB-pair would map to one row and OFDM symbols 1-14. The resource grid consists of two resource block pairs in time domain (a first set of OFDM symbols 1-14 followed by a second set of OFDM symbols 1-14) and 20 resource blocks in frequency domain (PRBs 1-20). In FIG. 4A, "PU" refers to PUCCH and "L" refers to the legacy PRACH channel which in this example is on the first PRB-pair (subframe) and the periodicity is larger than 1. The sPRACH can be scheduled within the uplink resource grid. In FIG. 4A, "S" refers to sPRACH, which in this example is scheduled over 6 PRBs in frequency. In the example, the frequency location of the sPRACH (PRBs 4-9) is not the same as the frequency location of the PRACH (PRBs 8-13). In the example, the sPRACH uses 4 OFDM symbols (OFDM Sym 1-4 in the second set of symbols), which is shorter than the 14 symbols used by the legacy PRACH channel (OFDM Sym 1-14 in the first set of symbols). The striped area "---" after sPRACH could either contain further sPRACH resources/sequences (e.g., for longer preambles) or some other uplink resources for wireless devices 110 supporting short TTIs (such as sPUSCH resources).

FIG. 4B is generally similar to FIG. 4A, however, FIG. 4B illustrates an example in which the sPRACH (S) uses at least a portion of the same subframe as the legacy PRACH (L) (e.g., both use OFDM Sym 1-4 in the first set of symbols) and the sPRACH uses one or more different subcarriers than the legacy PRACH (e.g., the sPRACH uses PRBs 3-8, whereas the legacy PRACH uses different PRBs 9-14).

As described above, it could also be possible to read the downlink control channel during the first OFDM symbols in a legacy TTI structure, so that the actual sPRACH channel would be later (in the same legacy subframe), enabling fast sending of the preambles immediately after the received downlink control information. FIG. 5 illustrates an example where the preamble over sPRACH is sent after reading the DCI in the used downlink control channel, assumed in this example to be located in the first 3 OFDM symbols of a TTI. FIG. 6 shows a further alternative with shorter TTI length. FIG. 6 illustrates an example of shorter TTI lengths of 4 OFDM symbols. The symbol before the sPRACH channel (shown as "X" in the figure) is used to receive and decode the DCI on a downlink control channel, and the remaining 3 OFDM symbols of the TTI are spent in the preamble transmission over sPRACH.

Figure 7:
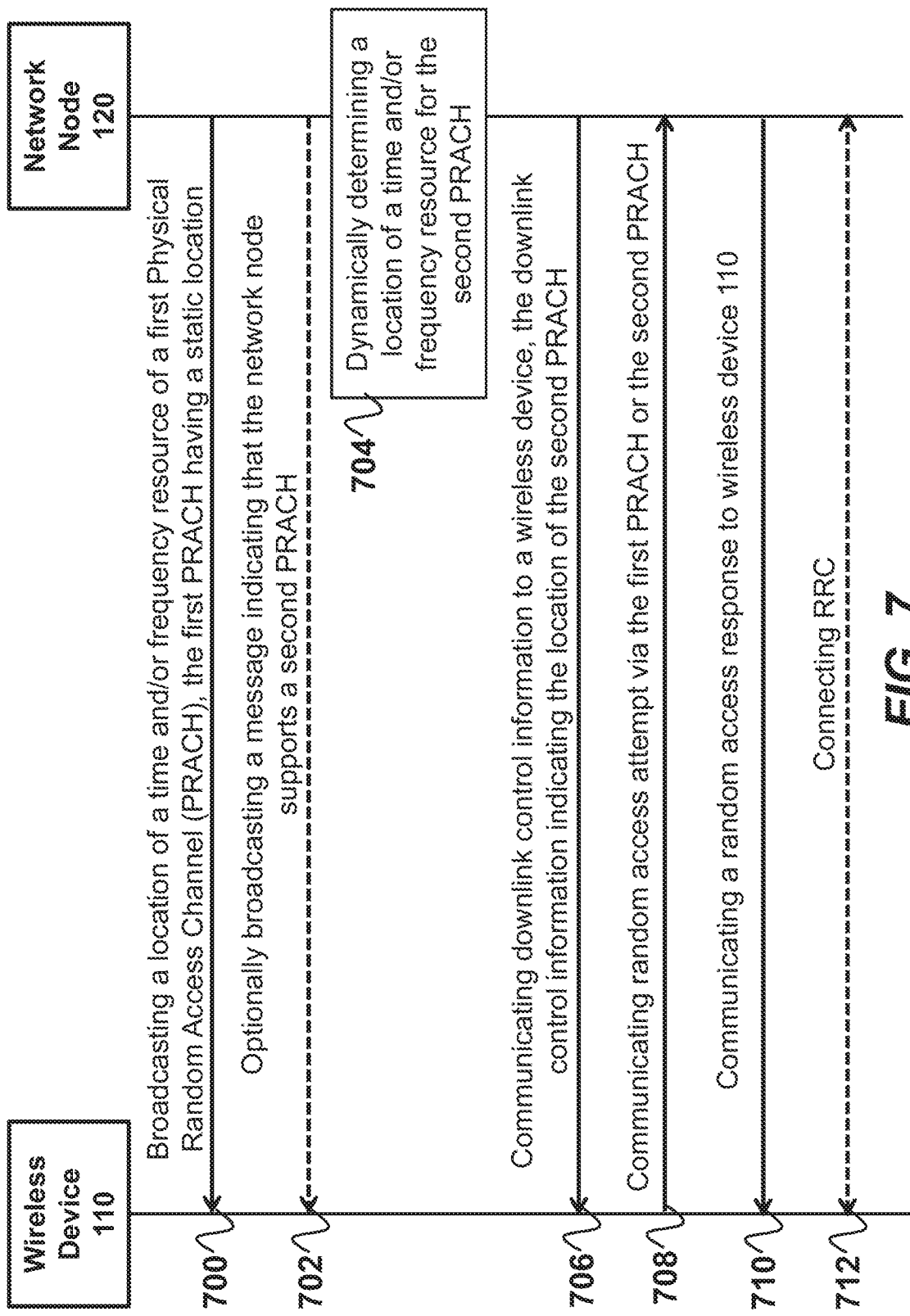
FIG. 7 illustrates an example of a message flow for random access, in accordance with certain embodiments of the present disclosure.

FIG. 7 illustrates an example of a message flow, in accordance with certain embodiments of the present disclosure. At step 700, network node 120 broadcasts a location of a time and/or frequency resource of a first Physical Random Access Channel (PRACH). The first PRACH has a static location. For example, in certain embodiments the time and/or frequency resource of the first PRACH is defined according to a legacy 3GPP standard. This may allow legacy wireless devices (i.e., devices that do not support the second PRACH) to continue to access the network via the first PRACH using legacy procedures.

Optionally, network node 120 broadcasts a message at step 702 indicating that the network node supports a second PRACH. Wireless device 110 may receive the message and, in response, monitor downlink control information to determine the location of the second PRACH. At step 704, network node 120 determines a location of a time and/or frequency resource for the second PRACH. The location of the second PRACH is determined dynamically. For example, in certain embodiments the location of the second PRACH is determined dynamically based on granting a semi persistent uplink grant for the second PRACH resource to the wireless device. In another example, the location of second PRACH is based on a placement of transmissions from other UEs. For example, the other UEs might have the benefit of a large continuous frequency allocation such that the sPRACH should be placed on the edge of the spectrum. In yet another example, the sPRACH is placed on other resources as compared to placements of sPRACH by other network nodes. In this way, the interference, or risk for colliding PRACH preambles, is reduced. FIGS. 4-6 illustrate resource grids showing example locations of the first PRACH (labeled "L") and the second PRACH (labeled "S"). The example locations include time resources (e.g., one or more OFDM symbols) and frequency resources (e.g., one or more PRBs). In certain embodiments, the second PRACH is shorter than the first PRACH. As an example, FIGS. 4-5 each use 14 OFDM symbols for the first PRACH and 4 OFDM symbols for the second PRACH. Using a shorter PRACH may allow for latency reduction during random access procedures via the second PRACH.

In certain embodiments, the first PRACH uses at least a portion of a same subframe as the second PRACH, and the first PRACH uses one or more different subcarriers than the second PRACH (see e.g., FIG. 4B). In certain embodiments, a single subframe comprises both (a) the downlink control information that indicates the location of the second PRACH, and (b) the second PRACH. For example, FIG. 5 illustrates an embodiment in which the downlink control information that indicates the location of the second PRACH may be located in the second OFDM symbols 1, 2, and 3 (marked "---") and the second PRACH may be located in the second OFDM symbols 4, 5, 6, and 7 (marked "S").

At step 706, network node 120 communicates downlink control information to wireless device 110. The downlink control information indicates the location of the second PRACH. In certain embodiments, the downlink control information implicitly or explicitly indicates the preamble sequence to be used by the wireless device when sending random access attempts via the second PRACH. In certain embodiments, the downlink control information implicitly or explicitly indicates that wireless device 110 is to override the first PRACH. For example, wireless device 110 may prioritize the second PRACH such that random access attempts are communicated via the second PRACH unless a determination is made to fall back to the first PRACH, such as discussed below with respect to FIGS. 13-14.

At step 708, wireless device 110 communicates a random access attempt to network node 120. In certain embodiments, the random access attempt comprising a preamble sequence that wireless device 110 communicates via the first PRACH or the second PRACH. At step 710, network node 120 communicates a random access response to wireless device 110. At step 712, wireless device 110 and network node 120 proceed with connecting an RRC connection.

Figure 8:
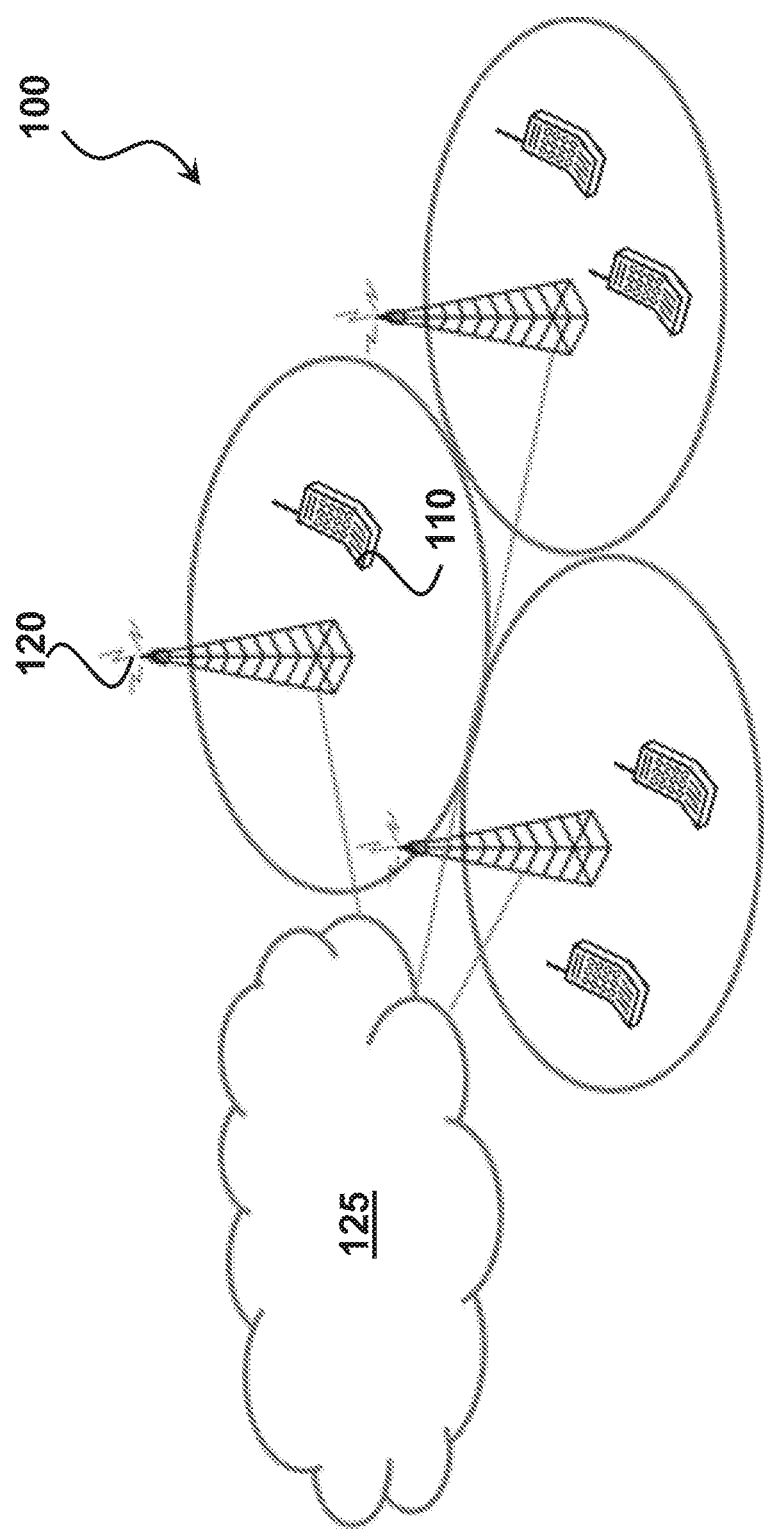
FIG. 8 illustrates an example block diagram of a wireless communication network, in accordance with certain embodiments of the present disclosure.

Although the described solutions may be implemented in any appropriate type of telecommunication system supporting any suitable communication standards and using any suitable components, particular embodiments of the described solutions may be implemented in an LTE network, such as that illustrated in FIG. 8.

As shown in FIG. 8, the example network may include one or more instances of wireless devices 110 and network nodes 120. Examples of wireless devices 110 include conventional user equipment (UEs) and machine type communication (MTC)/machine-to-machine (M2M) UEs. Examples of network nodes 120 include radio access nodes, such eNodeBs or other base stations capable of communicating with wireless devices 110. The network may also include any additional elements suitable to support communication between wireless devices 110 or between a wireless device 110 and another communication device (such as a landline telephone). Although the illustrated wireless devices 110 may represent communication devices that include any suitable combination of hardware and/or software, these wireless communication devices may, in particular embodiments, represent devices such as the example wireless device 110 illustrated in greater detail by FIG. 9. Similarly, although the illustrated network node 120 may represent network nodes that include any suitable combination of hardware and/or software, these nodes may, in particular embodiments, represent devices such as the example network node 120 illustrated in greater detail by FIG. 10.

Figure 9:
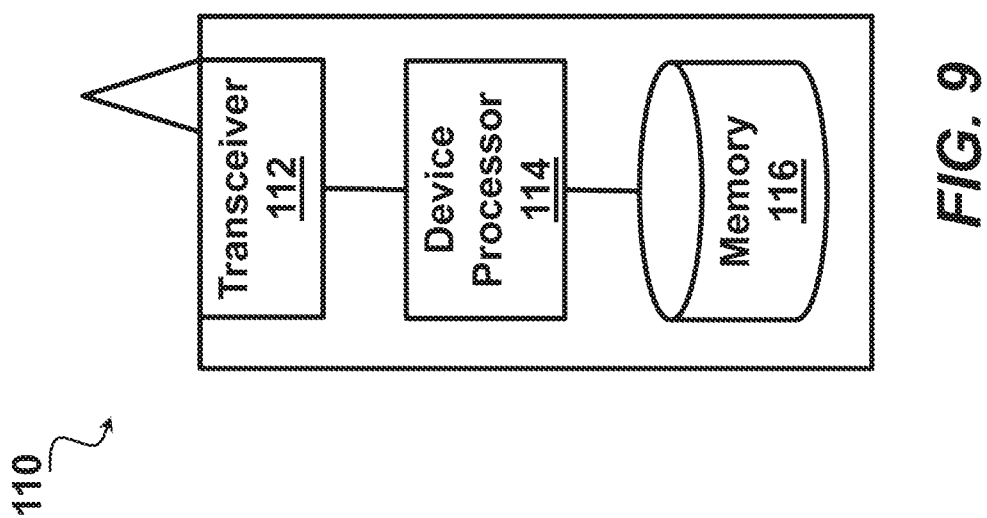
FIG. 9 illustrates an example block diagram of a wireless device, in accordance with certain embodiments of the present disclosure.

As shown in FIG. 9, the example wireless device 110 includes an antenna, a transceiver 112, a processor 114, and a memory 116. In particular embodiments, some or all of the functionality described above as being provided by UEs, MTC or M2M devices, and/or any other types of wireless communication devices may be provided by the device processor 114 executing instructions stored on a computer-readable medium, such as the memory 116 shown in FIG. 9. Alternative embodiments of wireless device 110 may include additional components beyond those shown in FIG. 9 that may be responsible for providing certain aspects of the device's functionality, including any of the functionality described above and/or any functionality necessary to support the solution described above.

Figure 10:
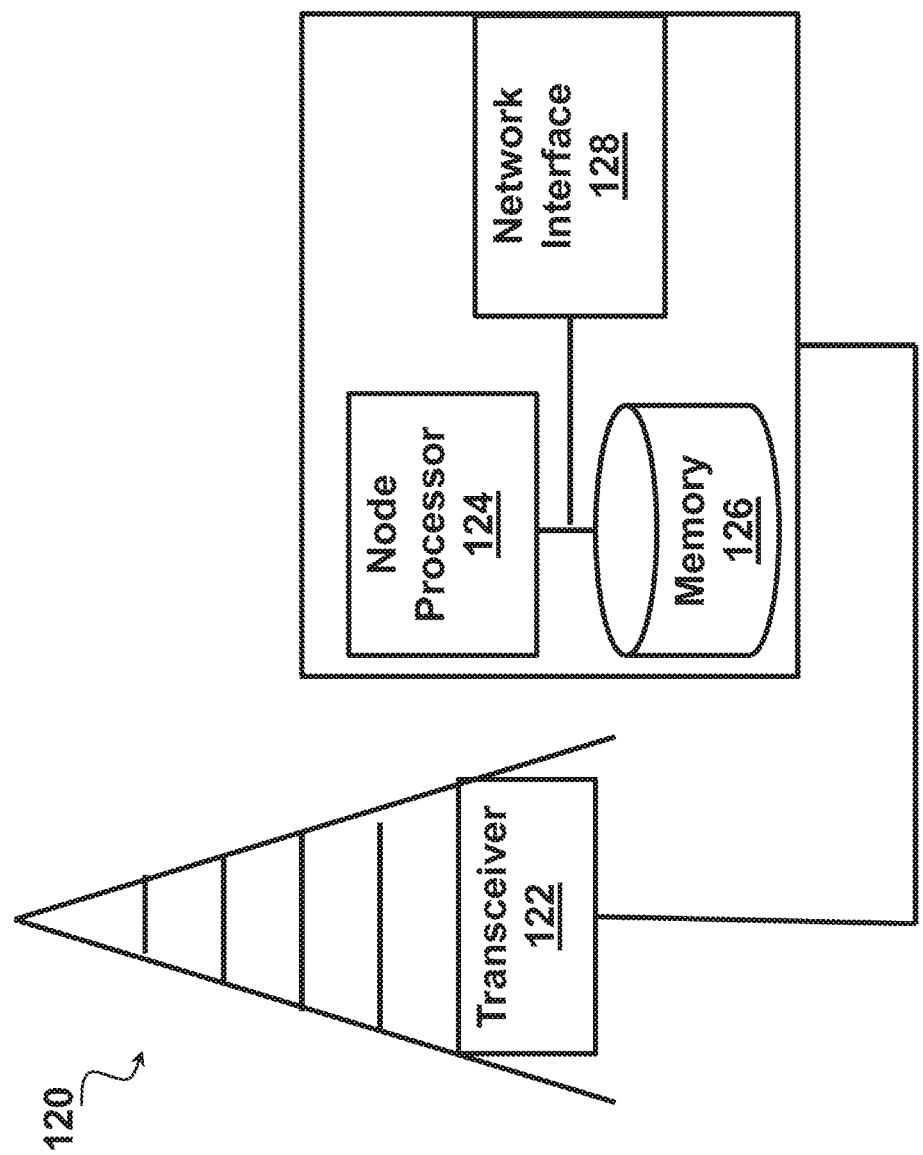
FIG. 10 illustrates an example block diagram of a network node, in accordance with certain embodiments of the present disclosure.

As shown in FIG. 10, the example network node 120 includes an antenna, a transceiver 122, a processor 124, a memory 126, and a network interface 128. In particular embodiments, some or all of the functionality described above as being provided by a radio access node, a base station, a node B, an enhanced node B, a base station controller, a radio network controller, a relay station and/or any other type of network node may be provided by the node processor 124 executing instructions stored on a computer-readable medium, such as the memory 126 shown in FIG. 10. Alternative embodiments of network node 120 may include additional components responsible for providing additional functionality, including any of the functionality identified above and/or any functionality necessary to support the solution described above.

Figure 11:
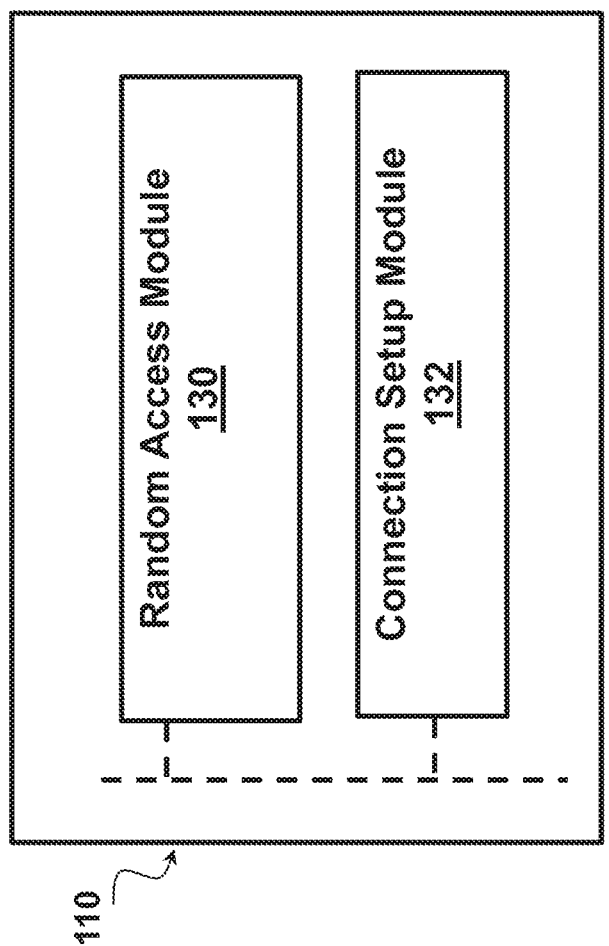
FIG. 11 illustrates an example block diagram of components of a wireless device, in accordance with certain embodiments of the present disclosure.

FIG. 11 illustrates an example of components that may be included in wireless device 110. The components include random access module 130 and connection setup module 132. In certain embodiments, random access module 130 receives (700) a location of a time and/or frequency resource of a first Physical Random Access Channel (PRACH) from a network node (120), the first PRACH having a static location, and receives (706) downlink control information from the network node, the downlink control information indicating the location of a second PRACH, the second PRACH having a dynamic location. Connection setup module 132 communicates a random access attempt via the first PRACH and/or the second PRACH and facilitates connection of the RRC. In certain embodiments, modules 130 and/or 132 may be implemented by processor 114 of FIG. 9.

Figure 12:
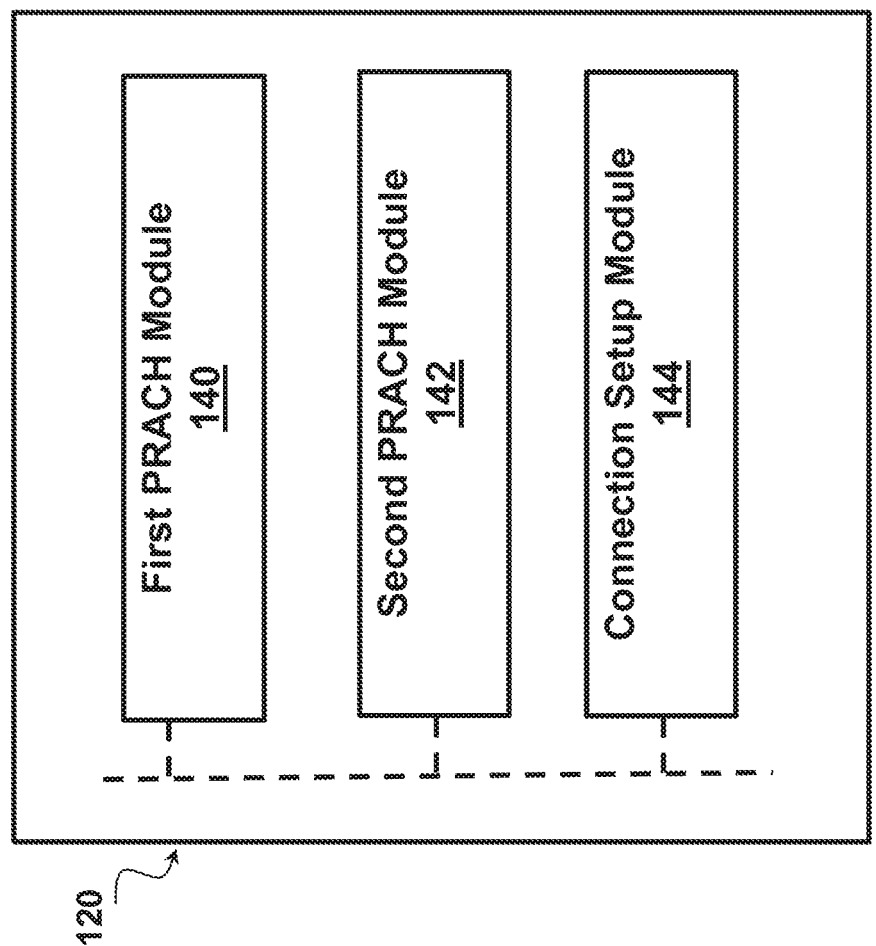
FIG. 12 illustrates an example block diagram of components of a network node, in accordance with certain embodiments of the present disclosure.

FIG. 12 illustrates an example of components that may be included in network node 120. The components include first PRACH module 140, second PRACH module 142, and connection setup module 144. In certain embodiments, first PRACH module 140 broadcasts (700) a location of a time and/or frequency resource of a first Physical Random Access Channel (PRACH), the first PRACH having a static location. Second PRACH module 142 determines (704) a location of a time and/or frequency resource for a second PRACH, the location of the second PRACH determined dynamically, and communicates (706) downlink control information to a wireless device 110, the downlink control information indicating the location of the second PRACH. Connection setup module 144 receives (708) a random access attempt from the wireless device via the first PRACH or the second PRACH, communicates (710) a random access response to the wireless device, and facilitates connection of the RRC. In certain embodiments, modules 140, 142, and/or 144 may be implemented by processor 124 of FIG. 10.

Figure 13:
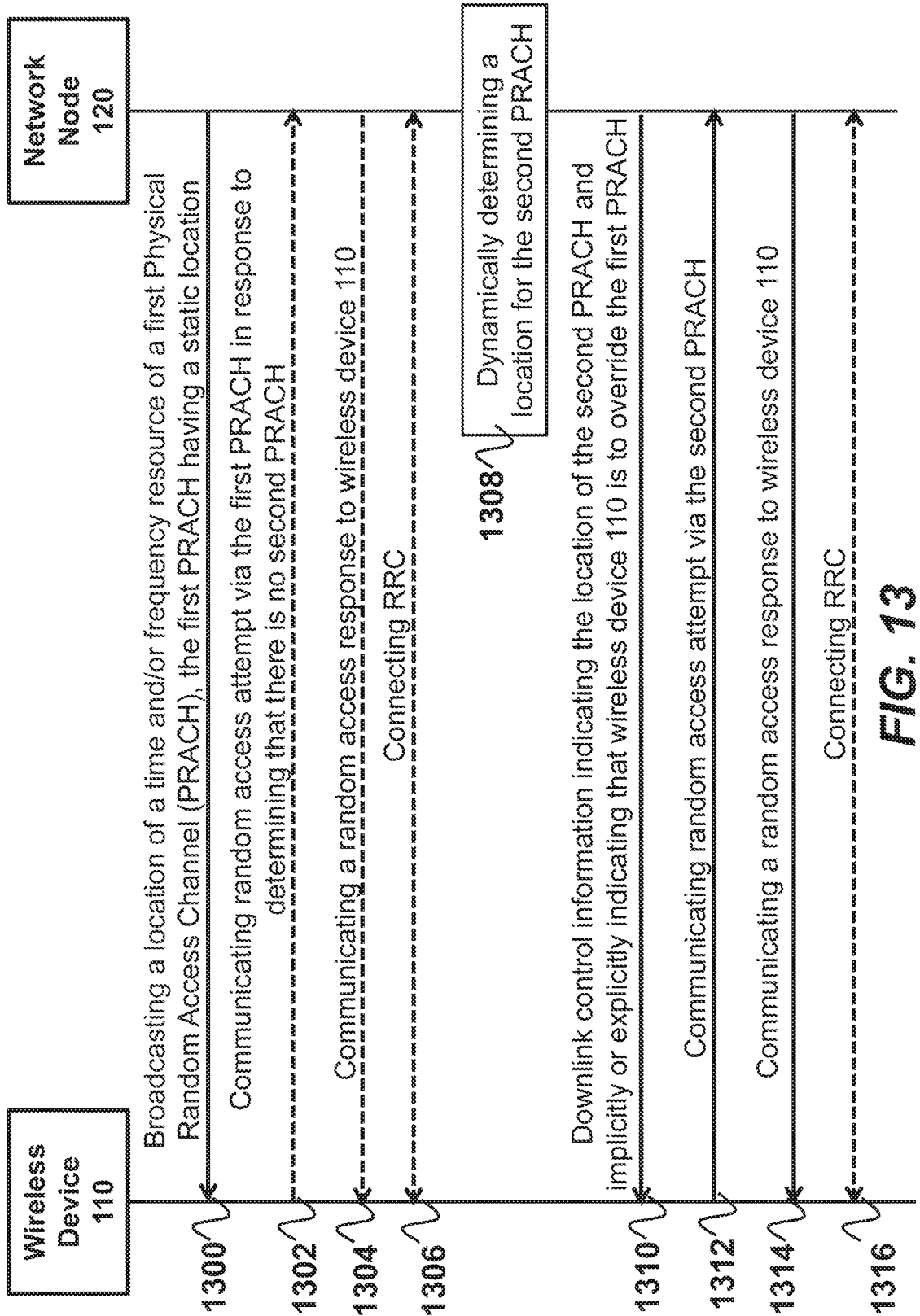
FIG. 13 illustrates an example of a message flow for random access, in accordance with certain embodiments of the present disclosure.

FIG. 13 illustrates an example of a message flow, in accordance with certain embodiments of the disclosure. At step 1300, network node 120 broadcasts a location of a time and/or frequency resource of a first PRACH. The first PRACH has a static location. Wireless device 110 may determine that there is no second PRACH, for example, if wireless device 110 has not received any grant of a second PRACH or if a previous grant of a second PRACH has ended. If wireless device 110 determines to make an access attempt when there is no second PRACH, at step 1302 wireless device 110 communicates the random access attempt via the first PRACH in response to determining that there is no second PRACH. At step 1304, network node 120 communicates a random access response to wireless device 110. At step 1306, wireless device 110 and network node 120 perform procedures for establishing an RRC connection. The RRC connection may be disconnected (not shown) when the connection is no longer needed.

At step 1308, network node 120 dynamically determines a location for a second PRACH. At step 1310, network node 120 communicates downlink control information to wireless device 120. The downlink control information indicates the location of the second PRACH and implicitly or explicitly indicates that the wireless device is to override the first PRACH. At step 1312, wireless device 110 communicates a random access attempt via the second PRACH (rather than the first PRACH, which has been overridden). At step 1314, network node 120 communicates a random access response, and at step 1316 wireless device 110 and network node 120 perform procedures for establishing an RRC connection. Wireless device 110 may fall back to the first PRACH for subsequent random access attempts, for example, in response to a determination that there is no second PRACH (e.g., if the grant of second PRACH ends) or in response to a determination that random access attempts using the second PRACH are unsuccessful, as discussed with respect to FIG. 14 below.

Figure 14:
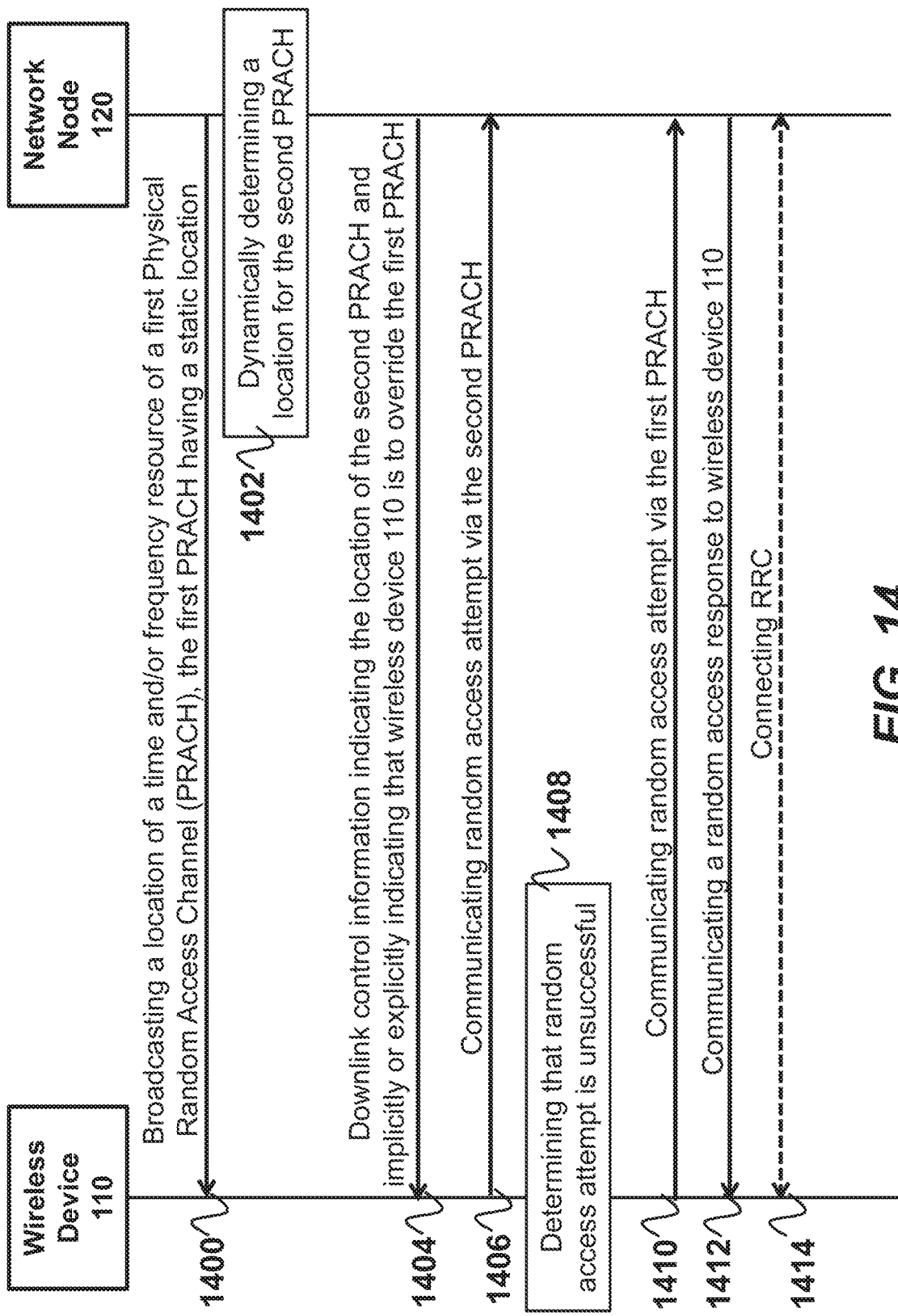
FIG. 14 illustrates an example of a message flow for random access, in accordance with certain embodiments of the present disclosure.

FIG. 14 illustrates an example of a message flow, in accordance with certain embodiments of the disclosure. At step 1400, network node 120 broadcasts a location of a time and/or frequency resource of a first PRACH. The first PRACH has a static location. At step 1402, network node 120 dynamically determines a location for a second PRACH. At step 1404, network node 120 communicates downlink control information to wireless device 120. The downlink control information indicates the location of the second PRACH and implicitly or explicitly indicates that the wireless device is to override the first PRACH. At step 1406, wireless device 110 communicates a random access attempt via the second PRACH (rather than the first PRACH, which has been overridden). At step 1408, wireless device 110 determines that the random access attempt via the second PRACH is unsuccessful. As an example, wireless device 110 may determine that the random access attempt is unsuccessful if a random access response is not received from network node 120 within a certain number of attempts or within a pre-determined time period. In response to determining that the random access attempt via the second PRACH is unsuccessful, wireless device 110 communicates a random access attempt via the first PRACH at step 1410. At step 1412, network node 120 communicates a random access response, and at step 1414 wireless device 110 and network node 120 perform procedures for establishing an RRC connection.

Reference has been made herein to various embodiments. However, a person skilled in the art would recognize numerous variations to the described embodiments that would still fall within the scope of the claims. Any two or more embodiments described in this document may be combined in any suitable way with each other. Furthermore, the examples can be adapted in suitable radio access technologies.

The method embodiments described herein describes example methods through method steps being performed in a certain order. However, it is recognized that these sequences of events may take place in another order without departing from the scope of the disclosed embodiments. Furthermore, some method steps may be performed in parallel even though they have been described as being performed in sequence. Some method steps may be added or omitted without departing from the scope of the disclosure.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method in a wireless device, the method comprising:
   receiving a location of a time and/or frequency resource of a first Physical Random Access Channel (PRACH) from a network node;

receiving a location of a time and/or frequency resource of a second PRACH, the second PRACH being different from the first PRACH and the second PRACH using different subcarriers than the first PRACH;

transmitting a first random access attempt via the first PRACH; and transmitting a second random access attempt via the second PRACH;

wherein the first PRACH and the second PRACH each have an associated preamble, and wherein the second PRACH preamble has a different length than the first PRACH preamble.

2. The method of claim 1, wherein the second PRACH preamble is shorter than the first PRACH preamble.

3. The method of claim 1, wherein the location of the time and/or frequency resource of the second PRACH is further restricted by a Physical Downlink Control Channel (PDCCH).

4. The method of claim 1, wherein the first PRACH corresponds to contention-based access and wherein the second PRACH corresponds to contention-free access.

5. The method of claim 1, further comprising receiving a Physical Downlink Control Channel (PDCCH) message triggering the transmitting a second random access attempt via the second PRACH.

6. The method of claim 1, wherein downlink control information indicates the preamble to be used by the wireless device when sending random access attempts via the second PRACH.

7. The method of claim 1, further comprising receiving downlink control information indicating the location of the second PRACH and indicating that the wireless device is to override the first PRACH.

8. A method in a network node, the method comprising:
broadcasting a location of a time and/or frequency resource of a first Physical Random Access Channel (PRACH);

broadcasting a location of a time and/or frequency resource of a second PRACH, the second PRACH being different from the first PRACH and the second PRACH using different subcarriers than the first PRACH;

receiving a first random access attempt from a wireless device via the first PRACH; and receiving a second random access attempt from the wireless device via the second PRACH;

wherein the first PRACH and the second PRACH each have an associated preamble, and wherein the second PRACH preamble has a different length than the first PRACH preamble.

9. The method of claim 8, wherein the second PRACH preamble is shorter than the first PRACH preamble.

10. The method of claim 8, wherein the location of the time and/or frequency resource of the second PRACH is further restricted by a Physical Downlink Control Channel (PDCCH).

11. The method of claim 8, wherein the first PRACH corresponds to contention-based access and wherein the second PRACH corresponds to contention-free access.

12. The method of claim 8, further comprising transmitting a Physical Downlink Control Channel (PDCCH) message triggering the receiving a second random access attempt via the second PRACH.

13. The method of claim 8, wherein downlink control information indicates the preamble to be used by the wireless device when sending random access attempts via the second PRACH.

14. The method of claim 8, further comprising transmitting downlink control information indicating the location of the second PRACH and indicating that the wireless device is to override the first PRACH.

15. A wireless device comprising:
processing circuitry configured to:
receive a location of a time and/or frequency resource of a first Physical Random Access Channel (PRACH) from a network node;

receive a location of a time and/or frequency resource of a second PRACH, the second PRACH being different from the first PRACH and the second PRACH using different subcarriers than the first PRACH;

transmit a first random access attempt via the first PRACH; and transmit a second random access attempt via the second PRACH;

wherein the first PRACH and the second PRACH each have an associated preamble, and wherein the second PRACH preamble has a different length than the first PRACH preamble.

16. The wireless device of claim 15, wherein the second PRACH preamble is shorter than the first PRACH preamble.

17. The wireless device of claim 15, wherein the location of the time and/or frequency resource of the second PRACH is further restricted by a Physical Downlink Control Channel (PDCCH).

18. The wireless device of claim 15, wherein the first PRACH corresponds to contention-based access and wherein the second PRACH corresponds to contention-free access.

19. The wireless device of claim 15, wherein the processing circuitry is further configured to receive a Physical Downlink Control Channel (PDCCH) message triggering the transmitting a second random access attempt via the second PRACH.

20. The wireless device of claim 15, wherein downlink control information indicates the preamble to be used by the wireless device when sending random access attempts via the second PRACH.

21. The wireless device of claim 15, wherein the processing circuitry is further configured to receive downlink control information indicating the location of the second PRACH and indicating that the wireless device is to override the first PRACH.

22. A network node comprising:
processing circuitry configured to:
broadcast a location of a time and/or frequency resource of a first Physical Random Access Channel (PRACH);

broadcast a location of a time and/or frequency resource of a second PRACH, the second PRACH being different from the first PRACH and the second PRACH using different subcarriers than the first PRACH;

receive a first random access attempt from a wireless device via the first PRACH; and receive a second random access attempt from the wireless device via the second PRACH;

wherein the first PRACH and the second PRACH each have an associated preamble, and wherein the second PRACH preamble has a different length than the first PRACH preamble.

23. The network node of claim 22, wherein the second PRACH preamble is shorter than the first PRACH preamble.

24. The network node of claim 22, wherein the location of the time and/or frequency resource of the second PRACH is further restricted by a Physical Downlink Control Channel (PDCCH).

25. The network node of claim 22, wherein the first PRACH corresponds to contention-based access and wherein the second PRACH corresponds to contention-free access.

26. The network node of claim 22, wherein the processing circuitry is further configured to transmit a Physical Downlink Control Channel (PDCCH) message triggering the receiving a second random access attempt via the second PRACH.

27. The network node of claim 22, wherein downlink control information indicates the preamble to be used by the wireless device when sending random access attempts via the second PRACH.

28. The network node of claim 22, wherein the processing circuitry is further configured to transmit downlink control information indicating the location of the second PRACH and indicating that the wireless device is to override the first PRACH.

* * * * *